UNITED STATES PATENT OFFICE.

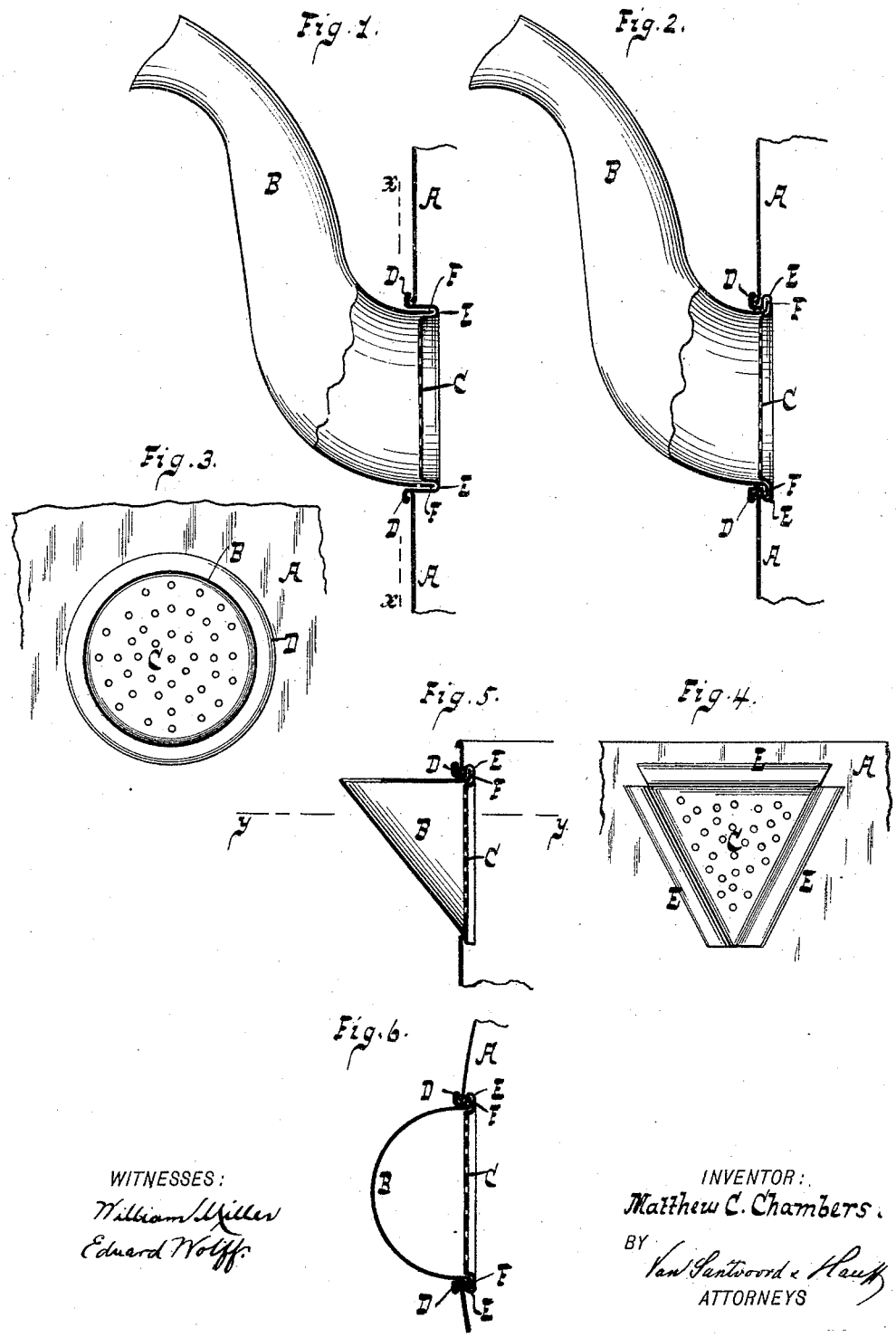

MATTHEW C. CHAMBERS, OF BROOKLYN, NEW YORK.

SHEET-METAL VESSEL OR POT.

SPECIFICATION forming part of Letters Patent No. 445,439, dated January 27, 1891.

Application filed June 28, 1890. Serial No. 357,103. (No model.)

*To all whom it may concern:*

Be it known that I, MATTHEW C. CHAMBERS, a citizen of the United States, residing at Brooklyn, in the county of Kings and State of New York, have invented new and useful Improvements in Sheet-Metal Vessels or Pots, of which the following is a specification.

This invention relates to improvements in sheet-metal vessels or pots, and by means of this invention a spout can be readily and firmly secured to the pot, as set forth in the following specification and claim, and illustrated in the accompanying drawings, in which—

Figure 1 is a sectional side elevation of a pot, showing the manner of applying the spout. Fig. 2 is a similar view, the spout being applied. Fig. 3 is a section along $x\,x$, Fig. 1. Fig. 4 is an inner view of a pot with a modified form of spout. Fig. 5 is a sectional side elevation of Fig. 4. Fig. 6 is a section along $y\,y$, Fig. 5.

In the drawings, the letter A indicates a wall or side of a vessel or pot for coffee, tea, or other substance, and B is a spout. The strainer C is set into a suitable opening in the wall A. This strainer is made of a suitable piece of metal and provided with a flange D, sitting against the outside of wall A. Said strainer has a groove adapted for the reception of the raw edge F of the spout. The strainer is set into the opening in wall A, and the spout edge F is set into the groove in the strainer, as seen in Fig. 1. The groove-walls E, with the spout edge F, are then bent or pressed against the inside of wall A, thus securing the strainer and spout to the pot, as seen in Fig. 2.

The spout may have a variety of forms in cross-section—as, for example, round or oval, triangular or otherwise, as desired. In Figs. 1 to 3 is shown a spout round in cross-section, and in Figs. 4 to 6 is shown a spout triangular in cross-section.

What I claim as new, and desire to secure by Letters Patent, is—

The combination, with a pot or vessel, of a strainer set into the side of the pot, said strainer having a flange resting against the outer face of the side of the pot and being provided with a groove, and a spout having its edge set into said groove, the spout edge and groove-walls being bent against the inside of the pot, substantially as described.

In testimony whereof I have hereunto set my hand in the presence of two subscribing witnesses.

M. C. CHAMBERS.

Witnesses:
   WM. C. HAUFF,
   E. F. KASTENHUBER.